Jan. 8, 1952     J. H. EAGLE     2,582,017
BALANCE

Filed April 24, 1947     3 Sheets-Sheet 1

John H. Eagle
INVENTOR
BY
ATTORNEYS

Jan. 8, 1952   J. H. EAGLE   2,582,017
BALANCE
Filed April 24, 1947   3 Sheets-Sheet 2
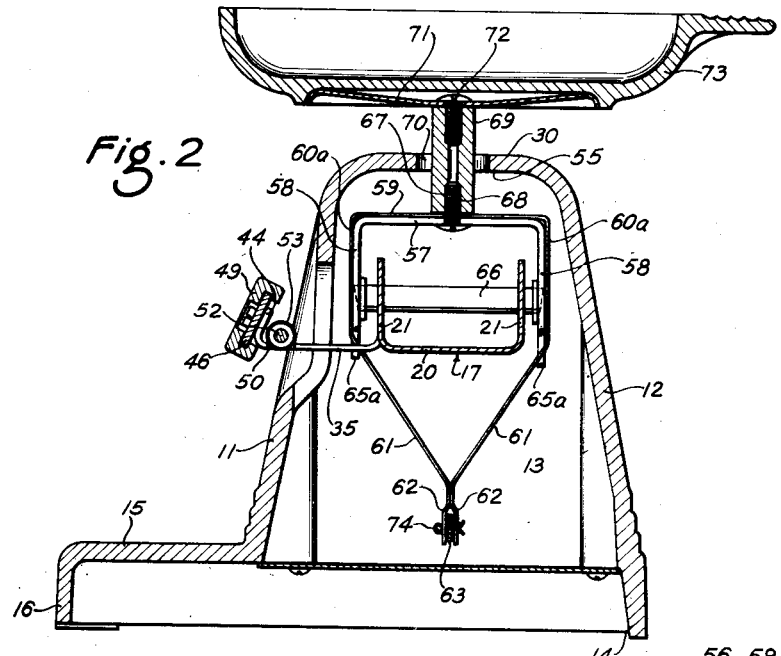
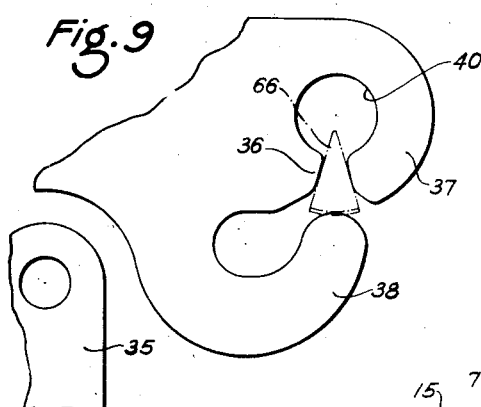
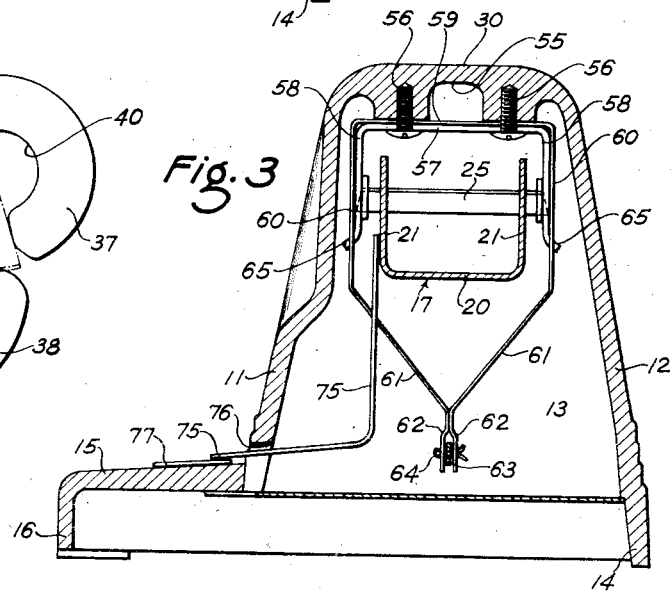
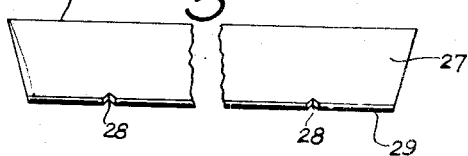
John H. Eagle
INVENTOR
BY
ATTORNEYS Jan. 8, 1952     J. H. EAGLE     2,582,017
BALANCE
Filed April 24, 1947     3 Sheets-Sheet 3
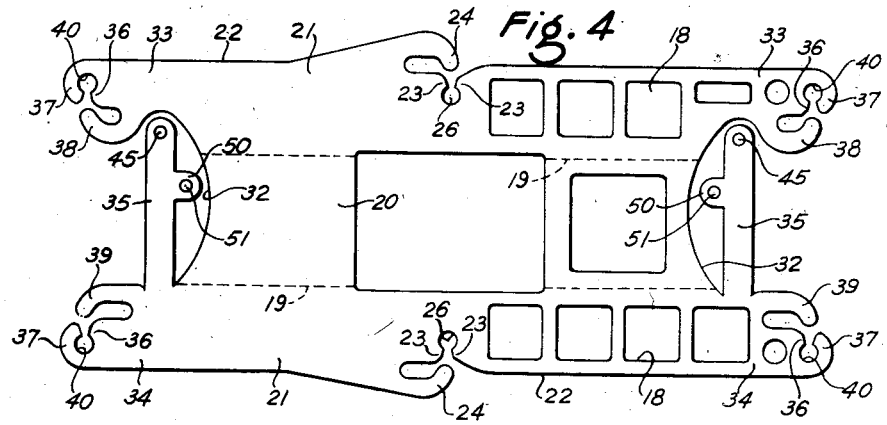
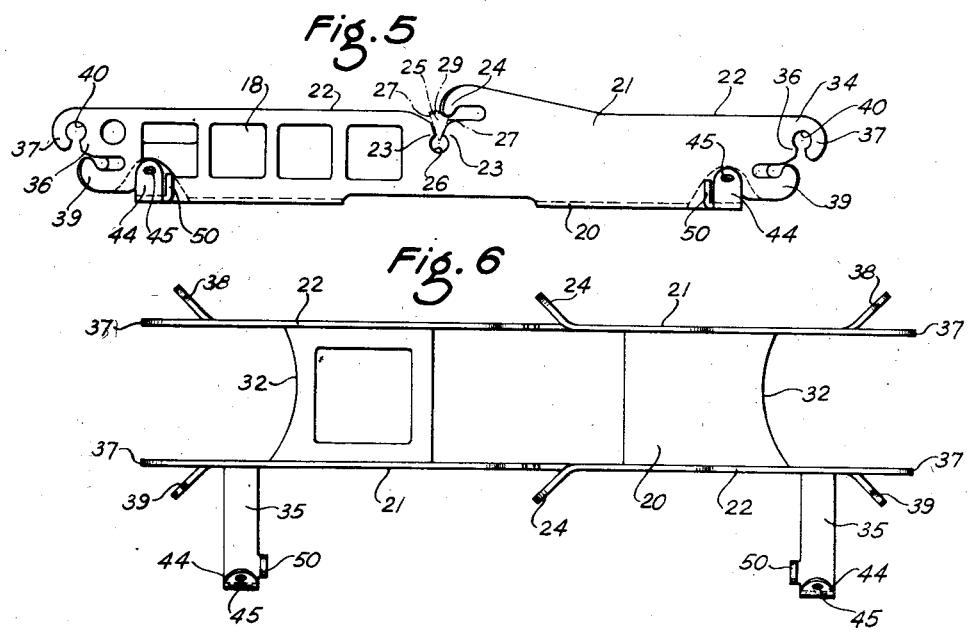
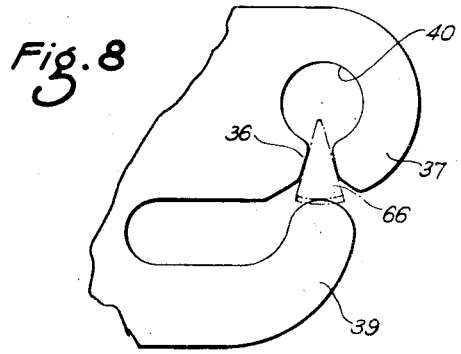
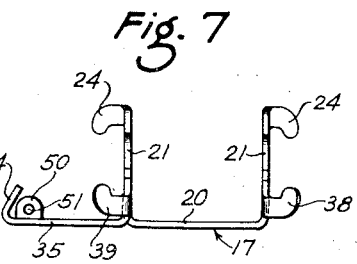
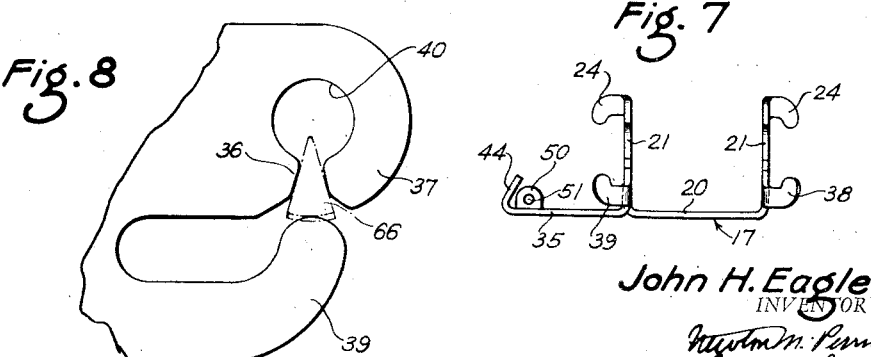
John H. Eagle
INVENTOR
BY
ATTORNEYS Patented Jan. 8, 1952

2,582,017

UNITED STATES PATENT OFFICE 2,582,017

BALANCE

John H. Eagle, Rochester, N. Y., assignor to Eastman Kodak Company, Rochester, N. Y., a corporation of New Jersey Application April 24, 1947, Serial No. 743,663

12 Claims. (Cl. 265—54)

1

The present invention relates to a balance, and more particularly to a balance of the type in which weighing pans are pivotally supported on the end of a beam which is pivoted at its center point on a base.

The principal object of the invention is the provision of a pivoted beam of novel construction.

A further object of the invention is the provision of a beam formed up from a strip of sheet material.

A still further object of the invention is the provision of trunnion-engaging and positioning means formed from the material of the base.

Yet another object of the invention is the provision of a simple and novel assembly as an end retainer for each trunnion and affording a pivot for a lower tie rod.

And another object of the invention is the provision of such an assembly which may be easily and readily connected to or detached from the trunnions.

To these and other ends, the invention resides in certain improvements and combinations of of parts, all as will be hereinafter more fully described, the novel features being pointed out in the claims at the end of the specification.

Fig. 2 is a vertical sectional view through one of the pan supports, showing the arrangement of the parts;

Fig. 3 is a vertical sectional view through the mid-point of the scale, showing the arrangement of the central pivot of the beam;

Fig. 4 is a plan view of the beam in sheet form;

Fig. 5 is a side elevation view of the beam, shown in Fig. 4, when the sides are bent down to form a channel for mounting as shown in Fig. 1;

Fig. 6 is a plan view of the channel-shaped beam illustrated in Fig. 5;

Fig. 7 is an end view of the channel-shaped beam illustrated in Figs. 5 and 6;

Fig. 8 is a partial view of one end of the beam showing the arrangement for mounting one end of an end trunnion;

Fig. 9 is a view similar to Fig. 8 but showing the arrangement for supporting the other end of one of the end trunnions; and Fig. 10 is a side elevation view of the trunnion or pivot for the beam.

Similar reference numerals throughout the various views indicate the same parts.

2

Figure 1:
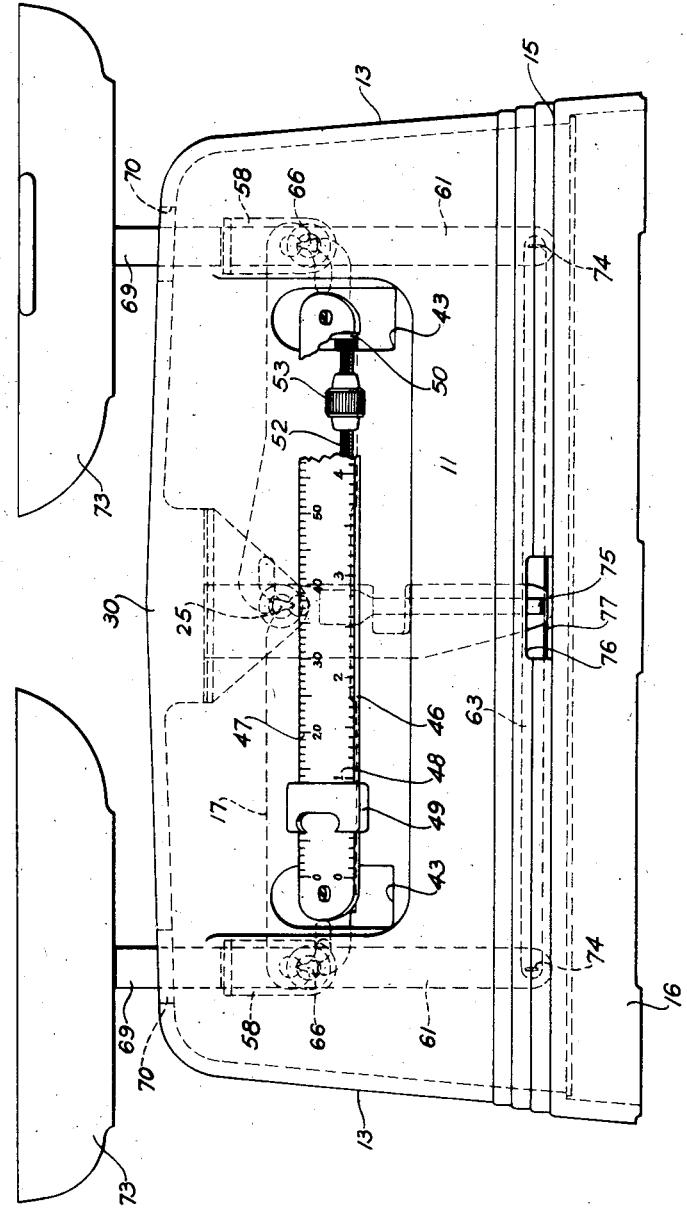
Fig. 1 is a front view of a balance constructed in accordance with the present invention, with parts cut away.

The operating parts of the balance of the present invention are housed in a one-piece hollow base formed of any suitable material and comprising a front wall 11, a back wall 12, and walls 13 and a top 30. The back and end walls terminate in supporting legs 14 while the lower end of the front wall projects forward to provide a support or shelf 15 on which weights, not shown, may be positioned. The free end of the shelf is bent down to provide supporting legs 16 which cooperate with the legs 14 to support the base, as shown in Figs. 1–3.

Positioned within the hollow base and adjacent the top thereof is a poise beam or bar of novel construction and generally indicated by the numeral 17 in Fig. 1. This beam is made from a single piece of sheet material, such as sheet metal, by punching or by other means to provide a flat structure of the shape shown in Fig. 4. The main portion of the sheet is formed with holes 18 of suitable shape which are provided for balancing purposes. These holes may be of any desired shape and are positioned to insure proper balance of the beam when pivoted about its center axis as will be later described. The sheet or blank of Fig. 4 is bent or folded down along lines 19 to form a channel having a bottom 20 and sides 21, as best shown in Figs. 6 and 7.

The upper edge 22 of each side of the beam 17 at its mid-point is formed with a pair of short spaced members 23 and an overhanging clawlike finger 24 in alignment with identical elements formed on the opposite side of the beam to provide spaced supports, as best shown in Fig. 5, for a central trunnion 25. The trunnion is substantially triangular in cross-section and has the apex pointed downwardly and extending into the aligned holes 26 on the sides 21 of the beam 17, see Fig. 5. The members 23 engage the slanting sides 27 of the trunnion while the fingers 24 engage in shallow slots or cuts 28 formed in the slightly-curved base 29. Thus the trunnion 25 is mounted on the beam 17 and the members 23 and 24 serve to position the trunnion thereon.

As the opposite ends of the beam 17 are identical in structure, only one will be described in detail and corresponding parts of the other end will be designated by the same numerals.

Referring now to Fig. 4, it will be seen that each end of the bottom 20 of the beam is provided with a curved cut-out 32 to provide a pair of spaced parallel side arms 33 and 34, and a transversely-extending arm 35, the purpose of the latter will be later described. Each arm 33 and 34 terminates in a short member 36 and an inturned clawlike finger 37. Also the arm 33 is formed with an additional finger 38 while the arm 34 is formed with a similar finger 39. The difference in fingers 33 and 39 is due to the fact that there is less material in arm 33 because of the cut-out for the free end of arm 35. When the sheet, in Fig. 4, is formed into channel shape, the fingers 36, 37, 38 and 39 provide spaced supports for the end trunnions 66, the latter being identical to the center trunnion 25 and corresponding parts will be designated by the same numerals. Each end trunnion is however arranged so that the apex extends into a circular opening 40 between the fingers 36 and 37 while the latter engage the sides 27 of the trunnion. Also the fingers 38 and 39 extend into the slots 28 to retain the end trunnions in position on the beam, as will be apparent. Thus the end trunnions, like the center trunnion, are supported on and carried by the beam, and are held in position thereon by cooperating flexible members or fingers formed from the material of the beam. In assembling the trunnions on the beam, certain of the fingers may be bent out, as shown in Figs. 5, 6 and 7, and after the trunnions are in place these fingers are bent back to snap into cuts 28.

The two arms 35 are bent so as to lie substantially in the plane of the bottom 20 and project laterally from the beam, as shown in Figs. 6 and 7, and extend through registering holes 43 in the front wall of the base. These arms are spaced longitudinally of the beam and have their free ends 44 bent up, as best shown in Fig. 7, and are provided with openings 45 to which the ends of a weigh scale 46 may be secured, as shown in Fig. 1. This scale is provided with upper grain designations 47 and lower gram designations 48. A sliding marker 49 is carried by the scale, the purpose of which will be apparent. Each arm 35 is also provided with a lateral ear 50 having an aperture 51. These ears are bent normal to the arms 35, see Figs. 5, 6 and 7, and receive the ends of a threaded member 52 which carries a threaded nut 53 used in the initial balancing.

In order to mount the beam 17, above-described, on the base, the under surface 55 of the top 30 of the base has secured thereto, by screws 56, the bottom 57 of an inner-inverted channel-shaped member, the sides 58 of which are spaced a distance greater than the sides 21 of the beam 17, and are formed with aligned openings adapted to receive the opposite ends of the center trunnion, as clearly illustrated in Fig. 3. Thus the center trunnion is supported on the base to provide a central pivot about which the beam may swing during the balancing. The bottom 59 of a second or outer-inverted channel-shaped member is held in place between the bottom 57 and the surface 55, and this second channel member is provided with depending sides 60 which overlie the sides 58 and are a depth greater than the latter and overlie the ends of the center trunnion to provide end retainers therefor to hold the trunnion in position in the sides 58.

The arrangement of the beam 17 and these overlying inverted channels is shown clearly in Fig. 3. The lower ends 61 of the sides 60 of the outer channel are bent towards each other and finally terminate in slightly-spaced members 62 between which a lower tie rod 63 is held by a cotter pin 64. As this outer channel is held securely to the top 30, by reason of the screws 56, the cotter pin provides a central fixed pivot for the tie rod 63 in vertical alignment with and positioned below the central trunnion, as is apparent from Figs. 1 and 3. The lower ends of the side walls 58 of the inner channel terminate in outturned ears 65 which extend through registering openings in the sides 60 of the outer channel to operatively connect the channels to form a unitary assembly for supporting the central trunnion. In assembling, the two channel members are first secured to the surface 55 by the screws 56. The sides 58 and 60 are then sprung apart slightly to position the trunnion 25 therebetween until the ends of the trunnion register with the holes in the sides 58. The sides are then allowed to spring back so that the ends of the central trunnion will be received in the registering holes in the sides 58 and the sides 60 engage the ends of the trunnion to prevent lateral or axial movement thereof and hence position the beam relative to the channel members. To disassemble, the sides 58 and 60 are sprung apart to withdraw the ends of the trunnion, and the beam and its attached trunnion may then be detached as a unit from the base.

The end trunnions 66 are mounted on the beam 17, as shown in Figs. 1, 8 and 9, and above-described. As the arrangement of both ends of the beam are identical, only one will be described in detail and corresponding parts of the other end will be designated by the same numerals. These end trunnions are connected removably to an end assembly which comprise a pair of overlying inverted channel members which are substantially identical to those shown in Fig. 3 and differ therefrom only in that the sides 60ᵃ of the outer channel are shallower and terminate substantially at the bottom of the inner sides 58 of the inner channel. Also, due to the shorter side 60ᵃ, the tongue 65ᵃ extends straight down through registering holes in the outer channel to secure the two channels in assembled relation to form a unitary end assembly which may be readily connected to and disconnected from the beam in the same manner as described above in connection with the central trunnion. Otherwise the center and end trunnion assemblies are identical in structure and mode of operation.

The bottoms 57 and 59 of the inner and outer channels of each end assembly, Fig. 2, has extending therethrough a screw 67 which engages in a registering threaded hole 68 in a post 69 projecting upwardly through an opening 70 in top 30. A pan support 71 is connected by a screw 72 to the post and carries a material or weight-receiving pan 73, as clearly illustrated in Fig. 2. Thus each pan 73 is connected to and supported by an end trunnion 66. The lower end 62 of the outer channel of each end assembly is pivotally connected by a cotter pin 74, or similar device, to an end of the tie rod 63. Thus the two end assemblies, comprising the inner and outer channel members, not only connect the end trunnions to the weighing pans 73, but also connect the end trunnions to the tie rod so that the latter cooperate with the beam 17 and the end assemblies to form a rectangle, the corners of which are pivotally connected. Also, this rectangle is provided with a fixed upper pivot at the central trunnion 25, and a fixed lower pivot at the cotter pin 64 which is in vertical alignment with the trunnion 25. With this arrangement, the end assemblies and the posts 69 will always remain in vertical position irrespective of the vertical displacement of the pans 73 due to the weights or material positioned therein, the advantage of which will readily be apparent to those familiar with balances of this type.

In use, a weight is first placed in one of the weighing pans 73. A fine adjustment may be secured by means of the sliding marker 49 and the proper scale 47 or 48. Such adjustment will throw the beam 17 out of level, as is apparent. When the proper weight has been adjusted, the material to be weighed is placed in the other pan, and when the pans are balanced and the beam 17 has returned to its horizontal position, the two pans are in balance. In order to indicate such a balance, the beam 17 is provided with or has secured thereto an L-shaped pointer 75 which extends through an opening 76 in the front 11 to overlie the shelf 15. The latter may be provided with a suitable scale 77 over which the pointer moves into balancing operation. This scale may be provided with a suitable central indicating mark, not shown, with which the pointer 75 will register when the two weighing pans are in balance to provide a visual means to determine when the balance is reached.

The present invention thus provides a scale formed with a new and improved form of scale beam formed from a strip of sheet material. Novel but rugged end assemblies and a central assembly are detachably connected to the center and end trunnions and connect these to the base and weighing pans respectively, as well as to the bottom tie rod. The construction provides a means by which the assemblies may be made as a sub-assembly and then connected to the trunnions in a simple and easy operation or be just as easily disconnected therefrom if and when necessary. The parts are light, yet rugged. In addition to connecting the pans to the end trunnion, the end assemblies also provide a connection between the end trunnions and the ends of the tie rod to form the ends of the reactangle mentioned above. The beam carries and positions the trunnions, and the latter are also held against end movement by the outer channel members of the cooperating assemblies of inner and outer channel members.

While one embodiment of the invention has been disclosed, it is to be understood that the inventive idea may be carried out in a number of ways. This application is, therefore, not to be limited to the precise details disclosed but is intended to cover all variations and modifications thereof falling within the scope of the appended claims.

I claim:

1. A balance comprising, in combination, a base, a channel-shaped scale-beam formed from a strip of sheet material, a central trunnion, end trunnions, means including bendable fingers formed from the material of said beam for detachably connecting said trunnions in position thereon, means for connecting said central trunnion to said base to pivot said beam thereon, and weighing pans supported on said end trunnions.

2. A balance comprising, in combination, a base, a channel-shaped scale-beam formed from a strip of sheet material, a central trunnion, end trunnions, cooperating flexible fingers formed from said beam for detachably connecting said trunnions thereto, means for connecting said central trunnion to said base to pivot said beam thereon, and weighing pans supported on said end trunnions.

3. A balance comprising, in combination, a base, a channel-shaped scale-beam formed from a strip of sheet material, a central trunnion, end trunnions, cooperating flexible fingers formed from said beam for detachably connecting said trunnions thereto, means on said trunnions cooperating with said fingers for positioning said trunnions laterally on said beam, means for connecting said central trunnion to said base to pivot said beam thereon, cooperating parts on said fingers and said trunnions for positioning said beam thereon, and weighing pans supported on said end trunnions.

4. A balance comprising, in combination, a base, a scale-beam formed from sheet material bent into a channel having a bottom and spaced sides, a central trunnion, aligned means including projecting fingers integral with said beam for supporting said trunnion on said sides at their mid-point, end trunnions, aligned means including fingers integral with said beam and positioned adjacent the ends of said sides for supporting said end trunnions, means for connecting the central trunnion to said base to provide a central pivot for said beam, and weighing pans supported by said end trunnions.

5. A balance comprising, in combination, a base, a scale-beam formed from sheet material bent into a channel having a bottom and spaced sides, a central trunnion, aligned means including yieldable members on said beam for supporting said trunnion on said sides at their mid-point, end trunnions, aligned means including yieldable members on the ends of said sides for supporting said end trunnions, means for connecting the central trunnion to said base to provide a central pivot for said beam, spaced arms formed from the material of and bent out from said beam and projecting laterally therefrom, a poise bar connected to said arms, initial balancing means supported by said arms, and weighing pans connected to and supported on said end trunnions.

6. A balance comprising, in combination, a base, a scale-beam formed from sheet material bent into a channel having a bottom and spaced sides, a central trunnion, aligned trunnion engaging fingers integral with said beam for supporting said trunnion on said sides at their mid-point, end trunnions, aligned trunnion engaging fingers integral with the ends of said sides for supporting said end trunnions, means for connecting the central trunnion to said base to provide a central pivot for said beam, spaced arms formed from the material of and bent out from said beam and projecting laterally therefrom, a poise bar connected to said arms, initial balancing means supported by said arms, weighing pans connected to and supported on said end trunnions, and cooperating means on said beam and trunnions to position said beam on said trunnions.

7. A balance comprising, in combination, a base, a channel-shaped scale-beam formed from a strip of sheet material, a central trunnion and end trunnions carried by said beam, a central assembly comprising a pair of inverted nesting channel members detachably connected to said central trunnion, means for rigidly connecting said assembly to said base to support said central trunnion in suspended relation on said base to provide a pivot for said beam, end assemblies comprising a pair of inverted nesting channel members detachably connected to said end trunnions, a lower tie rod, means for securing said tie rod to said assemblies, and weighing pans carried by said end assemblies.

8. A balance comprising, in combination, a base, a channel-shaped scale-beam formed from a strip of sheet material, a central trunnion and end trunnions carried by said beam, a bracket rigidly secured to said base and receiving the ends of said central trunnion to connect the latter to said base to provide a central pivot for said beam, a retainer connected to said base and overlying said bracket and said central trunnion to act as an end retainer for the latter, a pair of weighing pans, a support for each pan, a second bracket rigidly secured to each support and receiving the ends of one of said end trunnions to secure the pan supports to said end trunnions, and retainers secured to the supports and overlying the second brackets to retain the end trunnions in position in said second brackets.

9. A balance comprising, in combination, a base, a channel-shaped scale-beam formed from a strip of sheet material, a central trunnion and end trunnions carried by said beam, a bracket rigidly secured to said base and receiving the ends of said central trunnion to connect the latter to said base to provide a central pivot for said beam, a retainer connected to said base and overlying said bracket and said central trunnion to act as an end retainer for the latter, a lower tie rod, a depending portion on said retainer pivotally connected to said tie rod to provide a central pivot therefor in vertical alignment with said central trunnion, a pair of weighing pans, a support for each pan, a member secured to each support and provided with spaced parts adapted to receive the opposite ends of one of the end trunnions to connect the pan supports to said end trunnion and said beam, second retainers secured to said supports and overlying said members to provide end retainers for said end trunnions, and downwardly extending sections formed on said second retainers pivotally connected to the ends of said tie rod.

10. A balance comprising, in combination, a base, a channel-shaped scale-beam formed from a strip of sheet material, a central trunnion and end trunnions carried by said beam, said trunnions having the ends projecting laterally from both sides of said beam, inverted U-shaped brackets having spaced sides for receiving the projecting ends of said trunnions to connect said brackets thereto, a second inverted U-shaped member overlying each bracket and the ends of said trunnions to provide end retainers therefor to position the trunnions relative to said beam, means for securing the bracket and member connected to said central trunnion to said base to mount the central trunnion on the base to provide a central pivot for said beam, a lower tie rod, a depending section on the central member pivotally connected to said tie rod at its mid-point to provide a fixed pivot therefor in vertical alignment with said central trunnion, weighing pans, supports for said pans, means for attaching the brackets and members connected to said end trunnions to said supports to mount said end trunnions on said supports, and downwardly extending sections on said end members pivotally connected to the ends of said tie rod to connect the latter to said beam, said brackets and members being formed of yieldable material so that they may be sprung laterally to disconnect the beam and trunnions as a unit therefrom.

11. A balance comprising, in combination, a base, a sheet metal channel-shaped beam, the sides of said beam being slotted to provide opposed central and end trunnion supporting portions, a central trunnion and end trunnions engaging said respective trunnion supporting portions, integral deformable fingers projecting from said sides adjacent said trunnion supporting portions and engaging said trunnions to maintain the same in engagement with said trunnion supporting portions, a pair of integral arms projecting from the lower portion of said beam and spaced therealong, a poise bar supported by said arms, means for suspending the central trunnion from said base to provide a pivot for said beam, and weighing pans secured to said end trunnions.

12. A balance comprising, in combination, a base, a sheet metal channel-shaped beam, the sides of said beam being slotted to provide opposed central and end trunnion supporting portions, a central trunnion and end trunnions engaging said respective trunnion supporting portions, said trunnions being provided with slots integral fingers projecting from said sides adjacent said trunnion supporting portions and engaging said slots to maintain the trunnions in engagement with said trunnion supporting portions, means for supporting the central trunnion on said base to provide a pivot for said beam, and weighing pans secured to said end trunnions.

JOHN H. EAGLE.

REFERENCES CITED

The following references are of record in the file of this patent:

UNITED STATES PATENTS

| Number | Name | Date |
|---|---|---|
| 637,746 | Brown | Nov. 21, 1899 |
| 1,128,500 | Pestel | Feb. 16, 1915 |
| 1,526,569 | Sachse | Feb. 17, 1925 |
| 1,565,126 | Von Frommer | Dec. 8, 1925 |
| 1,859,604 | Sachse | May 24, 1932 |
| 2,011,649 | Phillips | Aug. 20, 1935 |
| 2,228,872 | Durfee | Jan. 14, 1941 |
| 2,503,218 | Rundquist | Apr. 4, 1950 |